(12) United States Patent
Nakagawara (10) Patent No.: US 10,257,425 B2
(45) Date of Patent: Apr. 9, 2019

(54) IMAGE CAPTURING APPARATUS AND CONTROL METHOD OF THE SAME

(71) Applicant: CANON KABUSHIKI KAISHA, Tokyo (JP)

(72) Inventor: Naoyuki Nakagawara, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/659,768

(22) Filed: Jul. 26, 2017

(65) Prior Publication Data
US 2018/0041712 A1 Feb. 8, 2018

(30) Foreign Application Priority Data
Aug. 5, 2016 (JP) .................. 2016-154947

(51) Int. Cl.
*H04N 5/232* (2006.01)
(52) U.S. Cl.
CPC ..... *H04N 5/23293* (2013.01); *H04N 5/23219* (2013.01); *H04N 5/23245* (2013.01)
(58) Field of Classification Search
CPC ............... G03B 17/20; H04N 5/23293; H04N 5/23219; H04N 5/23245
See application file for complete search history.

(56) References Cited

U.S. PATENT DOCUMENTS

| | | | |
|---|---|---|---|
| 8,416,333 B2 | 4/2013 | Nakai et al. | |
| 2010/0066888 A1* | 3/2010 | Nakai | G03B 7/26 348/333.01 |
| 2011/0050974 A1* | 3/2011 | Nakai | H04N 5/2251 348/333.01 |
| 2013/0128078 A1* | 5/2013 | Song | H04N 5/2251 348/231.99 |

FOREIGN PATENT DOCUMENTS

| | | |
|---|---|---|
| JP | 2011-071971 A | 4/2011 |
| JP | 5712360 B2 | 5/2015 |

* cited by examiner

*Primary Examiner* — Ahmed A Berhan
(74) *Attorney, Agent, or Firm* — Venable LLP (57) ABSTRACT

An image capturing apparatus performs control such that, if a first display unit is in a first folded position, display of a second display unit that is provided in an eyepiece viewfinder is started when an object is in proximity to the eyepiece viewfinder at a distance that is smaller than a first distance, and if the first display unit is in a second folded position, display of the second display unit of the eyepiece viewfinder is started when the object is in proximity to the eyepiece viewfinder at a distance that is smaller than a second distance, the second distance being greater than the first distance.

18 Claims, 5 Drawing Sheets

INVERTED CLOSED POSITION

FIG. 3B

CLOSED POSITION

FIG. 3C

OPEN POSITION

FIG. 3D

INVERTED OPEN POSITION

IMAGE CAPTURING APPARATUS AND CONTROL METHOD OF THE SAME

BACKGROUND OF THE INVENTION

Field of the Invention

The present invention relates to control for display of an eyepiece viewfinder of an image capturing apparatus.

Description of the Related Art

There are known image capturing apparatuses such as digital cameras that are provided with, as electronic viewfinders, a vari-angle (variable angle) display unit that is provided on the rear surface of the camera main body, as well as an eyepiece viewfinder to which a user brings his or her eye close to look thereinto. In this case, the eyepiece viewfinder is provided with an eyepiece sensor, and control is performed such that, if a user's eye is sensed to be in proximity to the eyepiece viewfinder, the display of the eyepiece viewfinder is turned on, and the display of the vari-angle display unit is turned off. On the other hand, control is also performed such that, when there is no detection of a user's eye that is in proximity to the eyepiece viewfinder, the display of the eyepiece viewfinder is turned off, and the display of the vari-angle display unit is turned on. The two monitor devices are automatically switched in this way based on whether or not an eye is in proximity to the eyepiece viewfinder, and electric power consumption is suppressed more than a case where both monitor devices perform display at the same time.

However, when such display control is performed, there may be cases where the eyepiece sensor erroneously detects that an eye is in the proximity to the eyepiece viewfinder if a finger of the user, a strap of the camera, or the like is located near the eyepiece sensor, and the monitor devices are switched at an unintended timing. Japanese Patent No. 5712360 discloses a technique in which the detection distance of the eyepiece sensor is changed between a state in which the vari-angle display unit is folded on the camera main body, and a state in which the vari-angle display unit is not folded, preventing the monitor devices from being switched due to erroneous detection of a finger, a strap, or the like, instead of an eye.

However, in Japanese Patent No. 5712360, depending on the timing at which an eye is sensed to be in proximity to the eyepiece viewfinder, the timing at which the display of the eyepiece viewfinder is started may be delayed, or the timing at which the display of the vari-angle display unit is turned off may be too early, resulting in inconvenience to the user.

SUMMARY OF THE INVENTION

The present invention has been made in consideration of the aforementioned problems, and realizes a technique for appropriately controlling the timing at which display of an eyepiece viewfinder is started, improving convenience to a user.

In order to solve the aforementioned problems, the present invention provides an image capturing apparatus comprising: a first display unit whose positional relationship with a main body is variable; an eyepiece viewfinder; a proximity detecting unit configured to detect that an object is in proximity to the eyepiece viewfinder; and a control unit configured to perform control such that, if the first display unit is in a first position in which the first display unit is folded on the main body without a display surface of the first display unit facing the main body, display of a second display unit that is provided in the eyepiece viewfinder is started when the proximity detecting unit detects that the object is in proximity to the eyepiece viewfinder at a distance that is smaller than a first distance, and if the first display unit is in a second position in which the first display unit is folded on the main body with the display surface of the first display unit facing the main body, display of the second display unit of the eyepiece viewfinder is started when the proximity detecting unit detects that the object is in proximity to the eyepiece viewfinder at a distance that is smaller than a second distance, the second distance being greater than the first distance.

In order to solve the aforementioned problems, the present invention provides a control method of an image capturing apparatus which has a first display unit whose positional relationship with a main body is variable, an eyepiece viewfinder, and a proximity detecting unit configured to detect that an object is in proximity to the eyepiece viewfinder, the method comprising: performing control such that, if the first display unit is in a first position in which the first display unit is folded on the main body without a display surface of the first display unit facing the main body, display of a second display unit that is provided in the eyepiece viewfinder is started when the proximity detecting unit detects that the object is in proximity to the eyepiece viewfinder at a distance that is smaller than a first distance, and performing control such that, if the first display unit is in a second position in which the first display unit is folded on the main body with the display surface of the first display unit facing the main body, display of the second display unit of the eyepiece viewfinder is started when the proximity detecting unit detects that the object is in proximity to the eyepiece viewfinder at a distance that is smaller than a second distance, the second distance being greater than the first distance.

In order to solve the aforementioned problems, the present invention provides a non-transitory computer-readable storage medium storing a program for causing a computer to execute a control unit of an image capturing apparatus having a first display unit whose positional relationship with a main body is variable; an eyepiece viewfinder and a proximity detecting unit configured to detect that an object is in proximity to the eyepiece viewfinder, wherein the control unit is configured to perform control such that, if the first display unit is in a first position in which the first display unit is folded on the main body without a display surface of the first display unit facing the main body, display of a second display unit that is provided in the eyepiece viewfinder is started when the proximity detecting unit detects that the object is in proximity to the eyepiece viewfinder at a distance that is smaller than a first distance, and if the first display unit is in a second position in which the first display unit is folded on the main body with the display surface of the first display unit facing the main body, display of the second display unit of the eyepiece viewfinder is started when the proximity detecting unit detects that the object is in proximity to the eyepiece viewfinder at a distance that is smaller than a second distance, the second distance being greater than the first distance.

According to the present invention, it is possible to appropriately control the timing at which the display of an eyepiece viewfinder is started, improving convenience to a user.

Further features of the present invention will become apparent from the following description of exemplary embodiments (with reference to the attached drawings).

DESCRIPTION OF THE EMBODIMENTS

Hereinafter, an embodiment of the present invention will be described in detail. In the present embodiment, an example in which the image capturing apparatus of the present invention is applied to a digital single-lens reflex camera (hereinafter, digital camera), which is an image capturing apparatus, will be described.

Apparatus Configuration

A configuration of the digital camera according to the present embodiment will be described with reference to FIG. 1.

Figure 1:
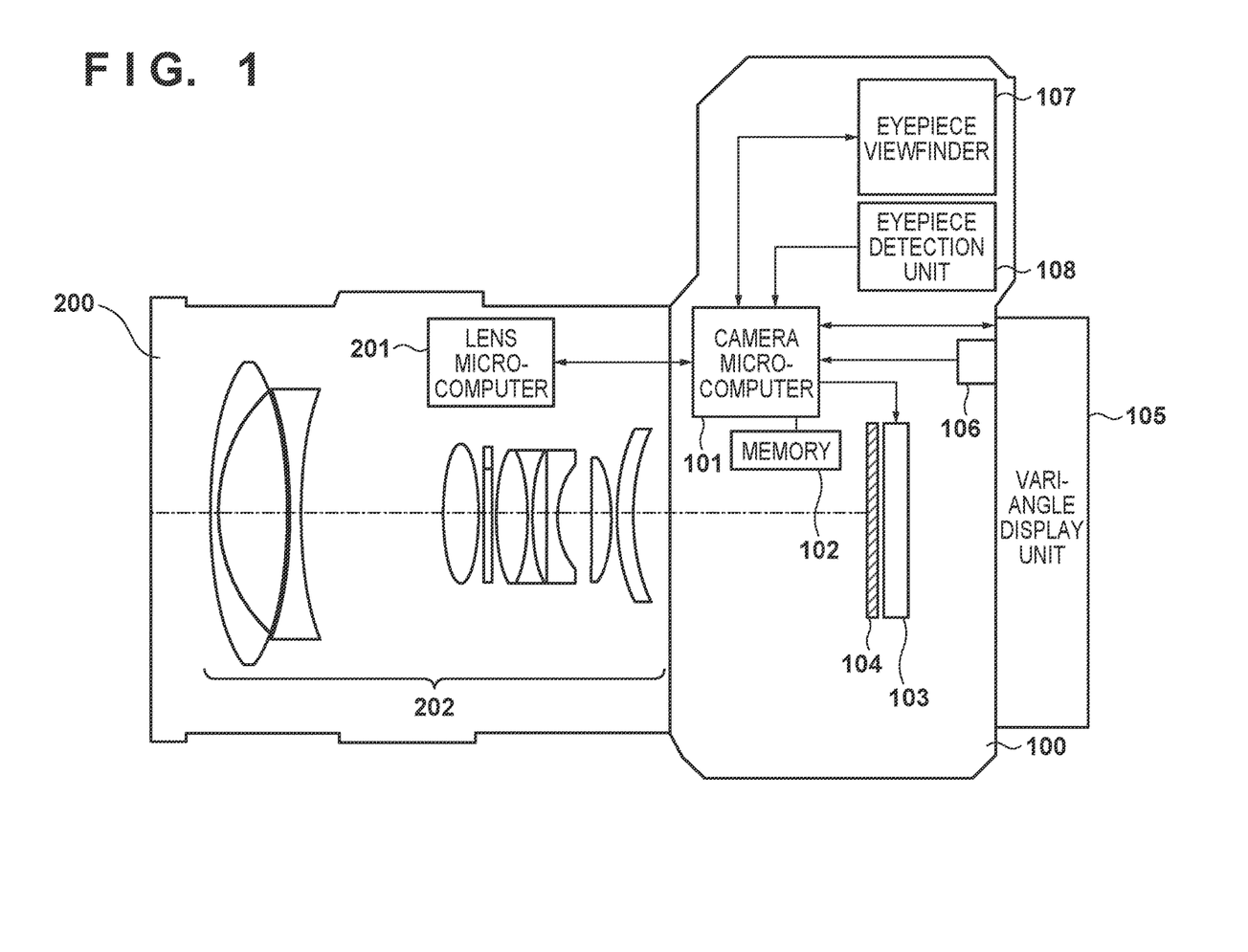
FIG. 1 is a block diagram illustrating a configuration of a digital camera according to the present embodiment.

In FIG. 1, a camera system of the present embodiment includes a camera main body 100 and a lens unit 200.

First, a configuration of the camera main body 100 will be described.

A camera microcomputer 101 is a camera controlling microcomputer that executes programs stored in a memory 102, which will be described later, to control the entire camera system. The camera microcomputer 101 includes, for example, a CPU, a ROM, a RAM, an input/output control circuit, and the like.

The memory 102 is an electrically erasable and storable nonvolatile memory, and an EEPROM or the like is used, for example. In the memory 102, constants for operation of the camera microcomputer 101, a program, and the like are stored. In this context, "program" refers to a program for executing the flowchart of EVF control processing that is executed in the present embodiment.

An image sensor 103 is an image sensor such as a CCD or CMOS that converts an optical image of a subject that was formed by the lens unit 200 into electric signals, and includes an infrared cut filter, a low-pass filter, and the like.

A shutter 104 operates between an open position at which beams of light that have passed through the lens unit 200 are guided to the image sensor 103 at the time of shooting, and a closed position at which the beams of light are shielded and prevented from entering the image sensor 103 when shooting is not being performed.

A vari-angle (variable angle) display unit 105 is an organic EL panel, a liquid crystal panel, or the like that is provided on the rear surface (opposite to the lens unit 200) of the camera main body 100 so that its positional relationship with the camera main body 100 is variable. A user can freely change the direction or angle of a display surface of the vari-angle display unit 105 with respect to the camera main body 100, or can rotate the vari-angle display unit 105. The vari-angle display unit 105 can be changed between states as shown in FIGS. 3A to 3D, for example.

Figure 3A:
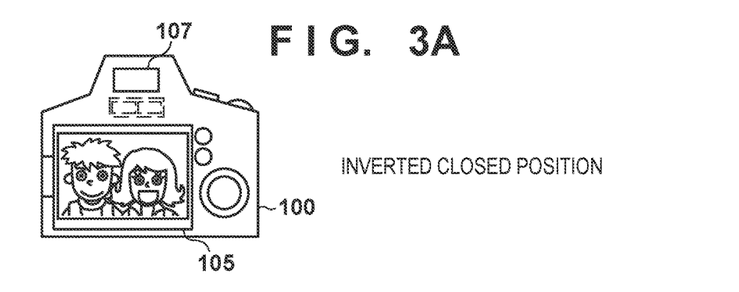
FIGS. 3A to 3D illustrate examples of attitudes of a vari-angle display unit of the present embodiment.

FIG. 3A shows the state (first position) in which the vari-angle display unit 105 is folded so that its rear surface (opposite to the display surface) faces the rear surface of the camera main body 100, that is, the state in which the user can monitor the display surface of the vari-angle display unit 105 from the rear side of the camera main body 100 (hereinafter, "inverted closed position").

Figure 3B:
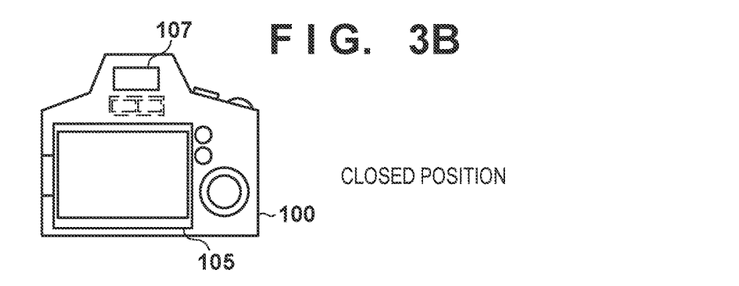

FIG. 3B shows the state (second position) in which the vari-angle display unit 105 is folded so that its display surface faces the rear surface of the camera main body 100, that is, the state in which the user cannot monitor the display surface of the vari-angle display unit 105 from the rear side of the camera main body 100 (hereinafter, "closed position").

Figure 3C:
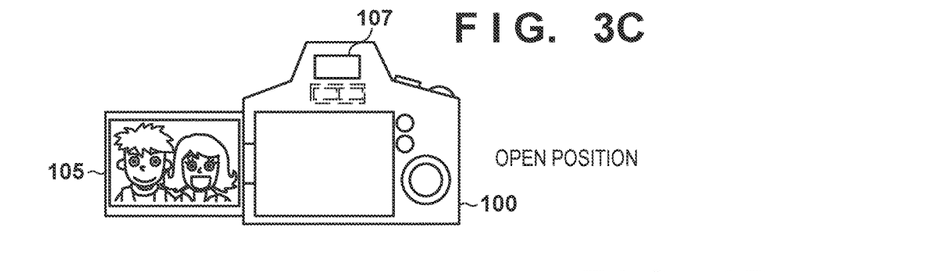

FIG. 3C shows the state (third position) in which the vari-angle display unit 105 is not folded on the rear surface of the camera main body 100, and is rotated so that the rear surface of the vari-angle display unit 105 is directed to the rear side (photographer side) of the camera main body 100, that is, the state in which the photographer can monitor the display surface of the vari-angle display unit 105 from the rear side of the camera main body 100 (hereinafter, "open position").

Figure 3D:
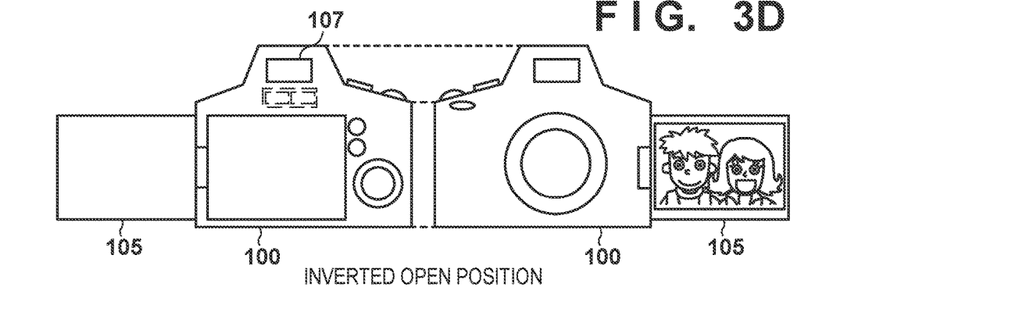

FIG. 3D shows the state (fourth position) in which the vari-angle display unit 105 is not folded on the rear surface of the camera main body 100, and is rotated so that the display surface of the vari-angle display unit 105 is directed to the rear side (subject side) of the camera main body 100, that is, the state in which the photographer cannot monitor the display surface of the vari-angle display unit 105 from the rear side of the camera main body 100 (hereinafter, "inverted open position").

An attitude/position detecting unit 106 is a sensor that detects the attitude and position (rotation angle (orientation) and position) of the vari-angle display unit 105, and a magnetic sensor or the like is used, for example. At least the states shown in FIGS. 3A to 3D can be detected by arranging a plurality of attitude/position detecting units 106 at a plurality of positions. Note that, although the vari-angle display unit 105 has attitudes (positions) that include not only the four states shown in FIGS. 3A to 3D but also states midway to the states of FIGS. 3A to 3D, such midway states are also handled in the same manner as any of the states shown in FIGS. 3A to 3D.

An eyepiece viewfinder 107 is a display unit in which an electronic viewfinder (EVF) is provided in an eyepiece viewfinder. The eyepiece viewfinder 107 is provided with an organic EL panel, a liquid crystal panel, or the like that can display a reproduced video and a shot video, and the user can look into the eyepiece viewfinder 107 to monitor the reproduced video and the shot video.

An eyepiece detection unit 108 is a proximity detection sensor that detects that an object such as a human eye is in proximity to the eyepiece viewfinder 107, and an infrared sensor or the like is used, for example. If the eyepiece detection unit 108 is an infrared sensor, infrared light projected from a light projecting unit of the sensor is reflected by an object that comes close to the eyepiece viewfinder 107, and the amount of reflected light is measured, enabling detection of the distance to the object (eyepiece distance).

The following will describe a configuration of the lens unit 200.

The lens unit 200 is detachable or fixed to the camera main body 100. The lens unit 200 is provided with a lens microcomputer 201, and a lens group 202 that includes a focus lens, a diaphragm, a zoom lens, and driving units for driving these components, and the lens microcomputer 201 controls operations of the components in accordance with predetermined programs. The lens microcomputer 201 is a lens controlling microcomputer that is communicably connected to the camera microcomputer 101 to mutually exchange data and communicate commands using the camera microcomputer 101 as a host. The lens microcomputer 201 includes, for example, a CPU, a ROM, a RAM, an input/output control circuit, and the like.

Display Control

Figure 2A:
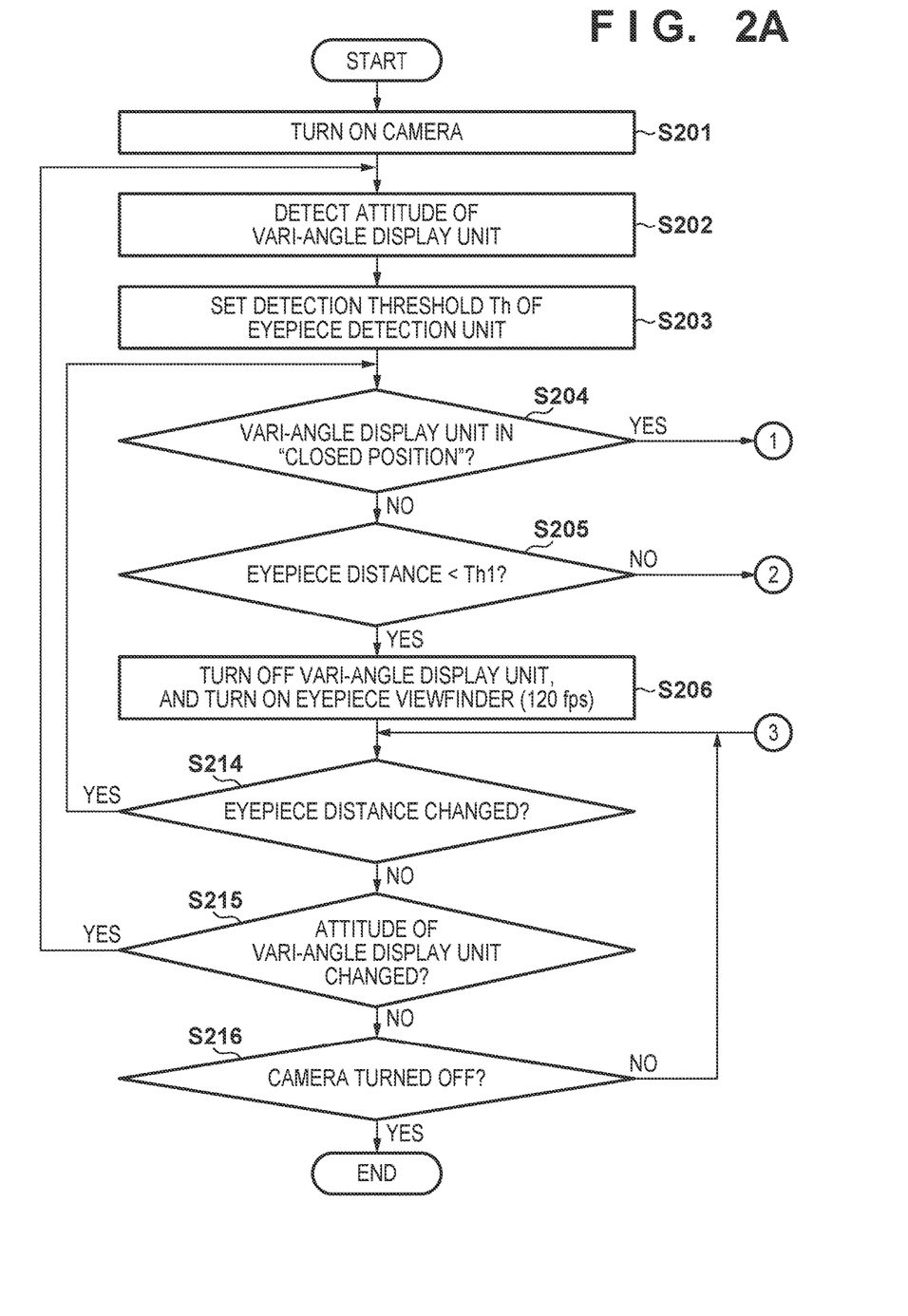
FIGS. 2A and 2B are flowcharts of display control processing according to the present embodiment.
Figure 2B:
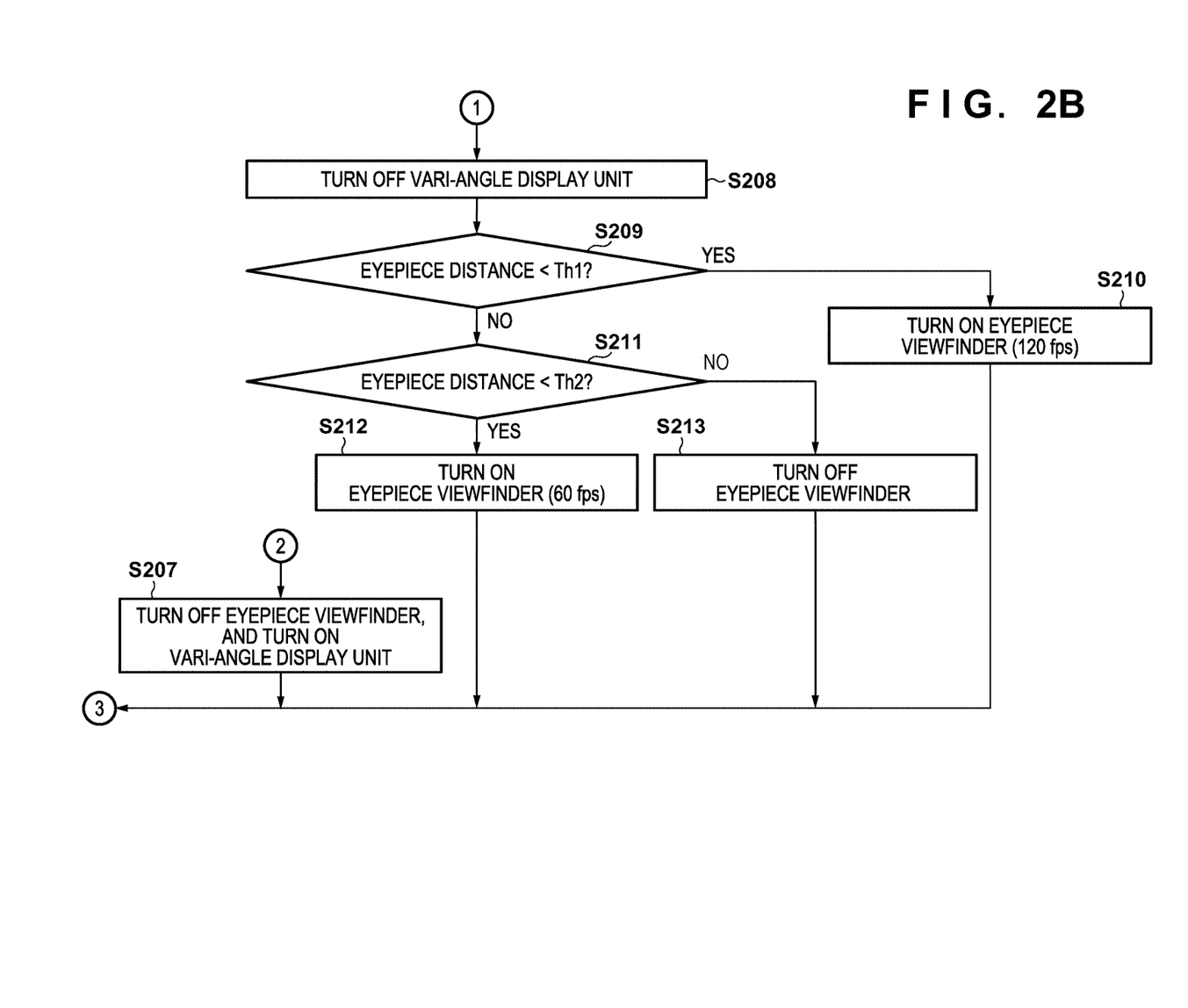

The following will describe processing for controlling the display of the vari-angle display unit 105 and the eyepiece viewfinder 107 that is performed by the digital camera according to the present embodiment, with reference to FIGS. 2A and 2B.

Note that the processing in FIGS. 2A and 2B are realized as a result of a program stored in the memory 102 being loaded in a work memory of the camera microcomputer 101 and being executed by the camera microcomputer 101.

In step S201, the camera microcomputer 101 turns the camera main body 100 on.

In step S202, the camera microcomputer 101 detects the attitude (position) of the vari-angle display unit 105 (one of the states of FIGS. 3A to 3D), based on a detected value output from the attitude/position detecting unit 106.

In step S203, the camera microcomputer 101 sets a detection threshold Th of the eyepiece detection unit 108 according to the attitude (position) of the vari-angle display unit 105 that was obtained in step S202.

Here, a method for setting a detection threshold of the eyepiece detection unit 108 will be described with reference to FIGS. 4A to 4D. If, as a result of the detection in step S202, the vari-angle display unit 105 has the attitude of the inverted closed position of FIG. 3A, the detection threshold Th (eye detection distance) of the eyepiece detection unit 108 is set to a first threshold Th1 of FIG. 4A. Furthermore, when the vari-angle display unit 105 has the attitude of the inverted closed position, it is likely that it is either the case where the user is monitoring a subject or the like using the eyepiece viewfinder 107 or the case where the user is monitoring a subject or the like using the vari-angle display unit 105. Accordingly, when determining the first threshold Th1, it is necessary to take into consideration both of these possible cases and make a determination placing a significance on balance. In this case, the first threshold Th1 is set to, for example, about 10 cm.

Figure 4A:
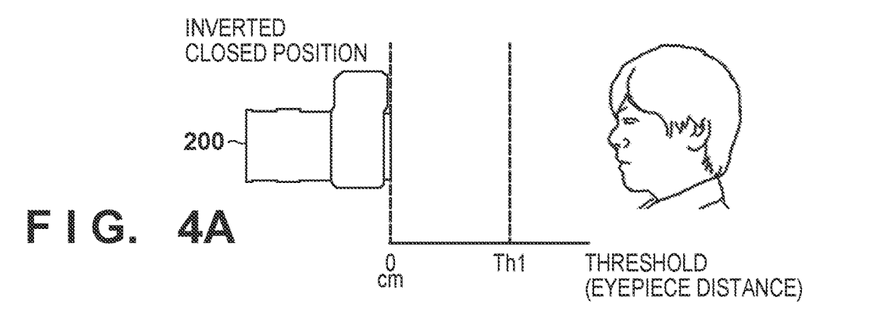
FIGS. 4A to 4D illustrate examples of eye detection threshold settings of the present embodiment.
Figure 4B:
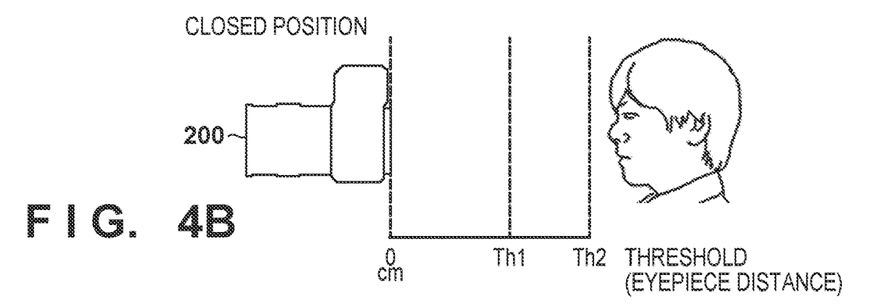

Furthermore, if the vari-angle display unit 105 has the attitude of the closed position of FIG. 3B, the detection threshold Th of the eyepiece detection unit 108 is set to a second threshold Th2 of FIG. 4B. When the vari-angle display unit 105 is in the closed position, the user cannot monitor the vari-angle display unit 105, and thus is highly likely to monitor a subject or the like using the eyepiece viewfinder 107. Accordingly, the second threshold Th2 is set to a value that is greater than the first threshold Th1, that is, a value that indicates a larger distance from the camera than that of the first threshold Th1. Accordingly, an eye is detected earlier than the case of the first threshold Th1, and thus it is possible to accelerate the timing at which the display of the eyepiece viewfinder 107 is turned on. FIG. 4B shows the position of the first threshold Th1 as well so that the relative positional relationship between the second threshold Th2 and the first threshold Th1 is apparent. The second threshold Th2 is set to, for example, about 20 cm.

Figure 4C:
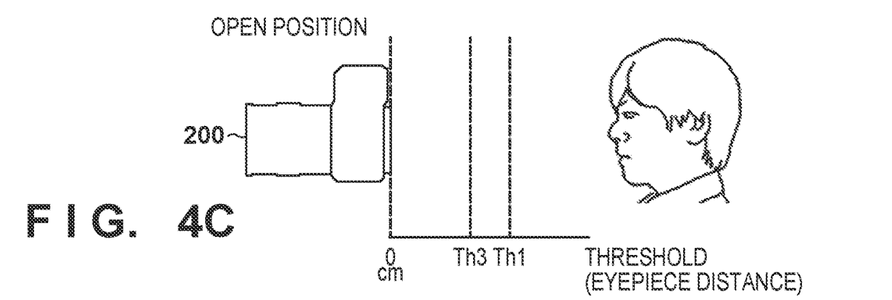

Furthermore, if the vari-angle display unit 105 has the attitude of the open position of FIG. 3C, the detection threshold Th of the eyepiece detection unit 108 is set to a third threshold Th3 of FIG. 4C. The vari-angle display unit 105 in the open position is typically used for high angle shooting or low angle shooting, and thus the eyepiece viewfinder 107 is less likely to be used as a monitor than the case where the vari-angle display unit 105 is in the closed position of FIG. 3B or the inverted closed position of FIG. 3A. Accordingly, the third threshold Th3 is set to a value that is smaller than the first threshold Th1, that is, a value that indicates a smaller distance to the camera than that of the first threshold Th1. Accordingly, an eye is detected later than the case of the first threshold Th1, and thus it is possible to prevent the monitor devices from being switched due to erroneous detection of an arm of the user, a strap of the camera, or the like. FIG. 4C shows the position of the first threshold Th1 as well so that the relative positional relationship between the third threshold Th3 and the first threshold Th1 is apparent. The third threshold Th3 is set to, for example, about 7.5 cm.

Figure 4D:
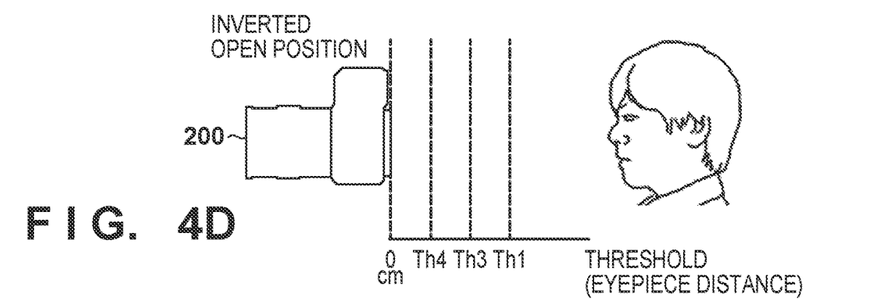

Furthermore, if the vari-angle display unit 105 has the attitude of the inverted open position of FIG. 3D, the detection threshold Th of the eyepiece detection unit 108 is set to a fourth threshold Th4 of FIG. 3D. The vari-angle display unit 105 in the inverted open position is typically used for self-portrait photography for example, and thus the eyepiece viewfinder 107 is even less likely to be used as a monitor device than the case where the vari-angle display unit 105 is in the inverted closed position of FIG. 3A or the open position of FIG. 3C. Accordingly, the fourth threshold Th4 is set to a value that is smaller than the first threshold Th1 and the third threshold Th3, that is, a value that indicates a smaller distance to the camera than those of the first threshold Th1 and the third threshold Th3. Accordingly, an eye is detected later than the case of the third threshold Th3, and thus it is possible to prevent the monitor devices from being switched due to erroneous detection of an arm of the user who is performing self-portrait photography, a strap of the camera, or the like. FIG. 4D shows the positions of the first threshold Th1 and the third threshold Th3 as well so that the relative positional relationship between the fourth threshold Th4, and the first and third thresholds Th1 and Th3 is apparent. The fourth threshold Th4 is set to, for example, about 5 cm.

If the vari-angle display unit 105 has the attitude of the inverted open position of FIG. 3D, there may be, in addition to the above-described usage of self-portrait photography, cases of usage in which the photographer looks into the eyepiece viewfinder 107 while showing a shot image to a subject on the vari-angle display unit 105. In this case, it is possible to set the fourth threshold Th4 to a value that is greater than the first threshold Th1, that is, a value that indicates a larger distance from the camera than that of the first threshold Th1, so that an eye is detected earlier than the case of the first threshold Th1. In this case, the fourth threshold Th4 is set to, for example, about 15 cm.

As described above, the detection threshold Th of the eyepiece detection unit 108 is set in step S203, and in step S204, whether or not the vari-angle display unit 105 has the attitude of the closed position is determined. For this determination, it is sufficient to use information indicating the attitude (position) of the vari-angle display unit 105 (detected value output from the attitude/position detecting unit 106) that was obtained in step S202. If it is determined in step S204 that the vari-angle display unit 105 does not have the attitude of the closed position, then the procedure advances to step S205.

In step S205, the camera microcomputer 101 determines whether or not the eyepiece distance to the user that was detected by the eyepiece detection unit 108 is smaller than the first threshold Th1 (of the inverted closed position of FIG. 3A). Note that in this explanation, it is premised that the vari-angle display unit 105 is in the inverted closed position of FIG. 3A. In step S205, it is also possible to determine whether or not the eyepiece distance to the user is smaller than the third threshold Th3 in the case where the vari-angle display unit 105 has the attitude of the open position of FIG. 3C, or to determine whether or not the eyepiece distance to the user is smaller than the fourth threshold Th4 in the case where the vari-angle display unit 105 has the attitude of the inverted open position of FIG. 3D.

If it is determined in step S205 that the eyepiece distance is smaller than the first threshold Th1, then the procedure advances to step S206, whereas if it is determined that the eyepiece distance is greater than the first threshold Th1, then the procedure advances to step S207.

In step S206, the camera microcomputer 101 turns the vari-angle display unit 105 off, and turns the display of the eyepiece viewfinder 107 on. In this case, it is preferable to drive the eyepiece viewfinder 107 at the display frame rate of, for example, 120 fps.

In step S207, the camera microcomputer 101 turns the eyepiece viewfinder 107 off, and turns the display of the vari-angle display unit 105 on.

This is an example of the operation when the vari-angle display unit 105 does not have the attitude of the closed position of FIG. 3B.

On the other hand, if it is determined in step S204 that the vari-angle display unit 105 has the attitude of the closed position of FIG. 3B, then the procedure advances to step S208.

In step S208, because the vari-angle display unit 105 has the attitude of the closed position of FIG. 3B, and information displayed on the vari-angle display unit 105 cannot be viewed by the user, the camera microcomputer 101 turns the vari-angle display unit 105 off in view of suppressing electric power consumption.

In step S209, the camera microcomputer 101 determines whether or not the eyepiece distance to the user that was detected by the eyepiece detection unit 108 is smaller than the first threshold Th1 (of the inverted closed position of FIG. 3A). If it is determined in step S209 that the eyepiece distance is smaller than the first threshold Th1, then the procedure advances to step S210, and if the eyepiece distance is greater than the first threshold Th1, then the procedure advances to step S211.

In step S210, the camera microcomputer 101 turns the display of the eyepiece viewfinder 107 on, and drives the eyepiece viewfinder 107 at the display frame rate of, for example, 120 fps.

In step S211, the camera microcomputer 101 determines whether or not the eyepiece distance to the user that was detected by the eyepiece detection unit 108 is smaller than the second threshold Th2 (of the closed position of FIG. 3B). If it is determined in step S211 that the eyepiece distance is smaller than the second threshold Th2, then the procedure advances to step S212, and if the eyepiece distance is greater than the second threshold Th2, then the procedure advances to step S213.

In step S212, the camera microcomputer 101 turns the display of the eyepiece viewfinder 107 on, and drives the eyepiece viewfinder 107 at the display frame rate of, for example, 60 fps. Thus, when the eyepiece distance is greater than the first threshold Th1 and smaller than the second threshold Th2, it is likely that the user is on the way to bringing his or her eye into proximity to the eyepiece viewfinder. In this case, the user does not feel that something is amiss even if the display frame rate of the eyepiece viewfinder 107 is reduced to about 60 fps, and thus it is possible to suppress electric power consumption using this reduction in the frame rate. Note that in step S212, it is also possible to reduce not only the display frame rate of the eyepiece viewfinder 107 but also the frame rate at which the image sensor 103 captures an image (live view image) compared to the state in step S210. As a result of the display of the eyepiece viewfinder 107 being started when the eyepiece distance is smaller than the second threshold Th2 as in step S212, the user is unlikely to feel a time lag in the time taken until the display starts, compared to a case where the display of the eyepiece viewfinder 107 is started when the eyepiece distance is the first threshold Th1 as in step S210.

In step S213, the camera microcomputer 101 turns the eyepiece viewfinder 107 off. Then, if any of the processes in steps S206, S207, S210, S212, and S213 is complete, the procedure advances to step S214. In step S214, the camera microcomputer 101 monitors whether or not there is a change in the eyepiece distance. If, in step S214, there is a change in the eyepiece distance, then the procedure returns to step S204, and processes from step S204 onward are performed again. If, in step S214, there is no change in the eyepiece distance, then the procedure advances to step S215.

In step S215, the camera microcomputer 101 monitors whether or not there is a change in the attitude of the vari-angle display unit 105. If, in step S215, there is a change in the attitude of the vari-angle display unit 105, then the procedure returns to step S202, and the processes from step S202 onward are performed again. If, in step S215, there is no change in the attitude of the vari-angle display unit 105, then the procedure returns to step S216.

In step S216, the camera microcomputer 101 determines whether or not the camera is turned off. If, in step S216, the camera is not turned off, the procedure returns to step S214, and the camera microcomputer 101 continues to monitor whether or not there is a change in the eyepiece distance and the attitude of the vari-angle display unit 105. If, in step S216, the camera is turned off, the procedure ends.

As described above, according to the present embodiment, by appropriately controlling the timing at which the display of the eyepiece viewfinder 107 is started in response to a change in the attitude of the vari-angle display unit 105, it is possible to improve upon situations in which the timing at which the display of the eyepiece viewfinder 107 is started is delayed, and the timing at which the display of the vari-angle display unit 105 is turned off is too early, thus achieving an improved convenience to the user.

Note that the various types of control that have been described above as being performed by the camera microcomputer 101 may also be performed by one piece of hardware, or a plurality of pieces of hardware may also share the processes to perform overall control of the apparatus.

Although the present invention has been described in detail based on the preferred embodiments thereof, the present invention is not limited to the specific embodiments, and also encompasses various modifications within the scope of the present invention without departing from the essence thereof. Furthermore, the above-described embodiments are merely examples of the present invention, and may also be combined with each other appropriately.

Furthermore, the embodiment above has been described taking, as an example, a case where the present invention is applied to an image capturing apparatus that is provided with a vari-angle display unit whose positional relationship with a camera main body is variable, as well as an electronic viewfinder provided within an eyepiece viewfinder, but the present invention is not limited to the example, and is applicable to any apparatus as long as it is an apparatus that includes, at a plurality of positions, monitor devices whose display can be switched between on and off. In other words, the present invention is applicable to apparatuses provided with monitor devices at a plurality of positions, such as a personal computer, a PDA, a mobile phone terminal, a portable image viewer, a display-equipped printer apparatus, a digital photo-frame, a music player, a game console, an electronic book reader, a tablet terminal, a smartphone, a projector apparatus, a display-equipped home electric appliance, a display-equipped in-car apparatus, and a display-equipped medical device.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-154947, filed Aug. 5, 2016 which is hereby incorporated by reference herein in its entirety.

What is claimed is:

1. An image capturing apparatus comprising:
a first display whose positional relationship with a main body is variable;
an eyepiece viewfinder;
a proximity detector configured to detect that an object is in proximity to the eyepiece viewfinder; and
(a) a memory and at least one processor and/or (b) at least one circuit, to perform the operations of the following unit:
a control unit configured to perform control such that, if the first display is in a first position in which the first display is folded on the main body without a display surface of the first display facing the main body, display of a second display that is provided in the eyepiece viewfinder is started when the proximity detector detects that the object is in proximity to the eyepiece viewfinder at a distance that is smaller than a first distance, and if the first display is in a second position in which the first display is folded on the main body with the display surface of the first display facing the main body, display of the second display of the eyepiece viewfinder is started when the proximity detector detects that the object is in proximity to the eyepiece viewfinder at a distance that is smaller than a second distance, the second distance being greater than the first distance,
wherein, when the first display is in the second position, the control unit sets the same frame rate as a frame rate in the case of the first position when the object is in proximity to the eyepiece viewfinder at a distance that is smaller than the first distance.

2. The apparatus according to claim 1, wherein the memory and the at least one processor and/or the at least one circuit further performs the operations of the following unit:
a setting unit configured to set a threshold for the proximity detector to detect that the object is in proximity to the eyepiece viewfinder,
wherein the control unit changes the threshold to control display of the first display and the second display.

3. The apparatus according to claim 1, further comprising:
a position detector configured to detect a position of the first display with respect to the main body.

4. The apparatus according to claim 1, further comprising:
an image sensor configured to capture an image,
wherein, when the first display is in the second position, the control unit controls the image sensor to capture an image at a lower frame rate than that in the case of the first position, as long as the object is in proximity to the eyepiece viewfinder at a distance that is greater than the first distance and smaller than the second distance.

5. The apparatus according to claim 1, wherein, when the first display is in the second position, the control unit performs control such that an image is displayed at a lower frame rate than that in the case of the first position, as long as the object is in proximity to the eyepiece viewfinder at a distance that is greater than the first distance and smaller than the second distance.

6. An image capturing apparatus comprising:
a first display whose positional relationship with a main body is variable;
an eyepiece viewfinder;
a proximity detector configured to detect that an object is in proximity to the eyepiece viewfinder; and
(a) a memory and at least one processor and/or (b) at least one circuit, to perform the operations of the following units:
(1) a setting unit configured to set a threshold for the proximity detector to detect that the object is in proximity to the eyepiece viewfinder; and
(2) a control unit configured to perform control such that, if the first display is in a first position in which the first display is folded on the main body without a display surface of the first display facing the main body, display of a second display that is provided in the eyepiece viewfinder is started when the proximity detector detects that the object is in proximity to the eyepiece viewfinder at a distance that is smaller than a first distance, and if the first display is in a second position in which the first display is folded on the main body with the display surface of the first display facing the main body, display of the second display of the eyepiece viewfinder is started when the proximity detector detects that the object is in proximity to the eyepiece viewfinder at a distance that is smaller than a second distance, the second distance being greater that the first distance, wherein the control unit changes the threshold to control display of the first display and the second display, and wherein, if the first display is in a third position in which the first display is not folded on the main body and the display surface of the first display faces a photographer, the setting unit sets the threshold to a distance that is smaller than that in the case of the first position.

7. The apparatus according to claim 6, wherein, if the first display is in a fourth position in which the first display is not folded on the main body and the display surface of the first display does not face a photographer, the setting unit sets the threshold to a distance that is smaller than that in the case of the third position.

8. The apparatus according to claim 6, wherein, when the first display is in the first position, the control unit performs control such that the first display is turned off and display of the second display of the eyepiece viewfinder is started when the proximity detector detects that the object is in proximity to the eyepiece viewfinder at a distance that is smaller than the first distance.

9. An image capturing apparatus comprising:
a first display whose positional relationship with a main body is variable;
an eyepiece viewfinder;
a proximity detector configured to detect that an object is in proximity to the eyepiece viewfinder; and
(a) a memory and at least one processor and/or (b) at least one circuit, to perform the operations of the following units:
(1) a setting unit configured to set a threshold for the proximity detector to detect that the object is in proximity to the eyepiece viewfinder; and
(2) a control unit configured to perform control such that, if the first display is in a first position in which the first display is folded on the main body without a display surface of the first display facing the main body, display of a second display that is provided in the eyepiece viewfinder is started when the proximity detector detects that the object is in proximity to the eyepiece viewfinder at a distance that is smaller than a first distance, and if the first display is in a second position in which the first display is folded on the main body with the display surface of the first display facing the main body, display of the second display of the eyepiece viewfinder is started when the proximity detector detects that the object is in proximity to the eyepiece viewfinder at a distance that is smaller than a second distance, the second distance being greater than the first distance,
wherein the control unit changes the threshold to control display of the first display and the second display, and
wherein, if the first display is in a third position in which the first display is not folded on the main and the display surface of the first display does not face a photographer, the setting unit sets the threshold to a distance that is smaller than that in the case of the first position.

10. An image capturing apparatus comprising:
a first display whose positional relationship with a main body is variable;
an eyepiece viewfinder;
a proximity detector configured to detect that an object is in proximity to the eyepiece viewfinder; and
(a) a memory and at least one processor and/or (b) at least one circuit, to perform the operations of the following units:
(1) a setting unit configured to set a threshold for the proximity detector to detect that the object is in proximity to the eyepiece viewfinder; and
(2) a control unit configured to perform control such that, if the first display is in a first position in which the first display is folded on the main body without a display surface of the first display facing the main body, display of a second display that is provided in the eyepiece viewfinder is started when the proximity detector detects that the object is in proximity to the eyepiece viewfinder at a distance that is smaller than a first distance, and if the first display is in a second position in which the first display is folded on the main body with the display surface of the first display facing the main body, display of the second display of the eyepiece viewfinder is started when the proximity detector detects that the object is in proximity to the eyepiece viewfinder at a distance that is smaller than a second distance, the second distance being greater than the first distance,
wherein the control unit changes the threshold to control display of the first display and the second display, and
wherein, if the first display is in a third position in which the first display is not folded on the main body and the display surface of the first display does not face a photographer, the setting unit sets the threshold to a distance that is greater than that in the case of the first position.

11. A control method of an image capturing apparatus which includes a first display whose positional relationship with a main body is variable, an eyepiece viewfinder, and a proximity detector configured to detect that an object is in proximity to the eyepiece viewfinder, the method comprising:
performing control such that, if the first display is in a first position in which the first display is folded on the main body without a display surface of the first display facing the main body, display of a second display that is provided in the eyepiece viewfinder is started when the proximity detector detects that the object is in proximity to the eyepiece viewfinder at a distance that is smaller than a first distance; and
performing control such that, if the first display is in a second position in which the first display is folded on the main body with the display surface of the first display facing the main body, display of the second display of the eyepiece viewfinder is started when the proximity detector detects that the object is in proximity to the eyepiece viewfinder at a distance that is smaller than a second distance, the second distance being greater than the first distance,
wherein, when the first display is in the second position, the method sets the same frame rate as a frame rate in the case of the first position when the object is in proximity to the eyepiece viewfinder at a distance that is smaller than the first distance.

12. A non-transitory computer-readable storage medium storing a program for causing a computer to execute a control unit of an image capturing apparatus including a first display whose positional relationship with a main body is variable, an eyepiece viewfinder, and a proximity detector configured to detect that an object is in proximity to the eyepiece viewfinder,
wherein the control unit is configured to perform control such that, if the first display is in a first position in which the first display is folded on the main body without a display surface of the first display facing the main body, display of a second display that is provided in the eyepiece viewfinder is started when the proximity detector detects that the object is in proximity to the eyepiece viewfinder at a distance that is smaller than a first distance, and if the first display is in a second position in which the first display is folded on the main body with the display surface of the first display facing the main body, display of the second display of the eyepiece viewfinder is started when the proximity detector detects that the object is in proximity to the eyepiece viewfinder at a distance that is smaller than a second distance, the second distance being greater than the first distance,
wherein, when the first display is in the second position, the control unit sets the same frame rate as a frame rate in the case of the first position when the object is in proximity to the eyepiece viewfinder at a distance that is smaller than the first distance.

13. A method of an apparatus including a first display whose positional relationship with a main body is variable, an eyepiece viewfinder, and a proximity detector configured to detect that an object is in proximity to the eyepiece viewfinder, the method comprising:
setting a threshold for the proximity detector to detect that the object is in proximity to the eyepiece viewfinder; and
controlling such that, if the first display is in a first position in which the first display is folded on the main body without a display surface of the first display facing the main body, display of a second display that is provided in the eyepiece viewfinder is started when the proximity detector detects that the object is in proximity to the eyepiece viewfinder at a distance that is smaller than a first distance, and if the first display is in a second position in which the first display is folded on the main body with the display surface of the first display facing the main body, display of the second display of the eyepiece viewfinder is started when the proximity detector detects that the object is in proximity to the eyepiece viewfinder at a distance that is smaller than a second distance, the second distance being greater that the first distance,
wherein the controlling changes the threshold to control display of the first display and the second display, and
wherein, if the first display is in a third position in which the first display is not folded on the main body and the display surface of the first display faces a photographer, the setting sets the threshold to a distance that is smaller than that in the case of the first position.

14. A non-transitory apparatus-readable medium storing a program which, when executed by an apparatus, causes the apparatus to execute a method according to claim 13.

15. A method of an apparatus including a first display whose positional relationship with a main body is variable, an eyepiece viewfinder, and a proximity detector configured to detect that an object is in proximity to the eyepiece viewfinder, the method comprising:
setting a threshold for the proximity detector to detect that the object is in proximity to the eyepiece viewfinder; and
controlling such that, if the first display is in a first position in which the first display is folded on the main body without a display surface of the first display facing the main body, display of a second display that is provided in the eyepiece viewfinder is started when the proximity detector detects that the object is in proximity to the eyepiece viewfinder at a distance that is smaller than a first distance, and if the first display is in a second position in which the first display is folded on the main body with the display surface of the first display facing the main body, display of the second display of the eyepiece viewfinder is started when the proximity detector detects that the object is in proximity to the eyepiece viewfinder at a distance that is smaller than a second distance, the second distance being greater than the first distance,
wherein the controlling changes the threshold to control display of the first display and the second display, and
wherein, if the first display is in a third position in which the first display is not folded on the main body and the display surface of the first display does not face a photographer, the setting sets the threshold to a distance that is smaller than that in the case of the first position.

16. A non-transitory apparatus-readable medium storing a program which, when executed by an apparatus, causes the apparatus to execute a method according to claim 15.

17. A method of an apparatus including a first display whose positional relationship with a main body is variable, an eyepiece viewfinder, and a proximity detector configured to detect that an object is in proximity to the eyepiece viewfinder, the method comprising:
setting a threshold for the proximity detector to detect that the object is in proximity to the eyepiece viewfinder; and
controlling such that, if the first display is in a first position in which the first display is folded on the main body without a display surface of the first display facing the main body, display of a second display that is provided in the eyepiece viewfinder is started when the proximity detector detects that the object is in proximity to the eyepiece viewfinder at a distance that is smaller than a first distance, and if the first display is in a second position in which the first display is folded on the main body with the display surface of the first display facing the main body, display of the second display of the eyepiece viewfinder is started when the proximity detector detects that the object is in proximity to the eyepiece viewfinder at a distance that is smaller than a second distance, the second distance being greater than the first distance,
wherein the controlling changes the threshold to control display of the first display and the second display, and
wherein, if the first display is in a third position in which the first display is not folded on the main body and the display surface of the first display does not face a photographer, the setting sets the threshold to a distance that is greater than that in the case of the first position.

18. A non-transitory apparatus-readable medium storing a program which, when executed by an apparatus, causes the apparatus to execute a method according to claim 17.

* * * * *